3,369,836
REMOVABLE PROTECTIVE SHIELD
FOR MOTORCYCLES
Gerald E. Haycock, Monterey Park, Calif. (P.O. Box 615, Alhambra, Calif. 91802), and Richard A. Duffy, P.O. Box 615, Alhambra, Calif. 91802
Filed Aug. 1, 1966, Ser. No. 569,141
6 Claims. (Cl. 296—78.1)

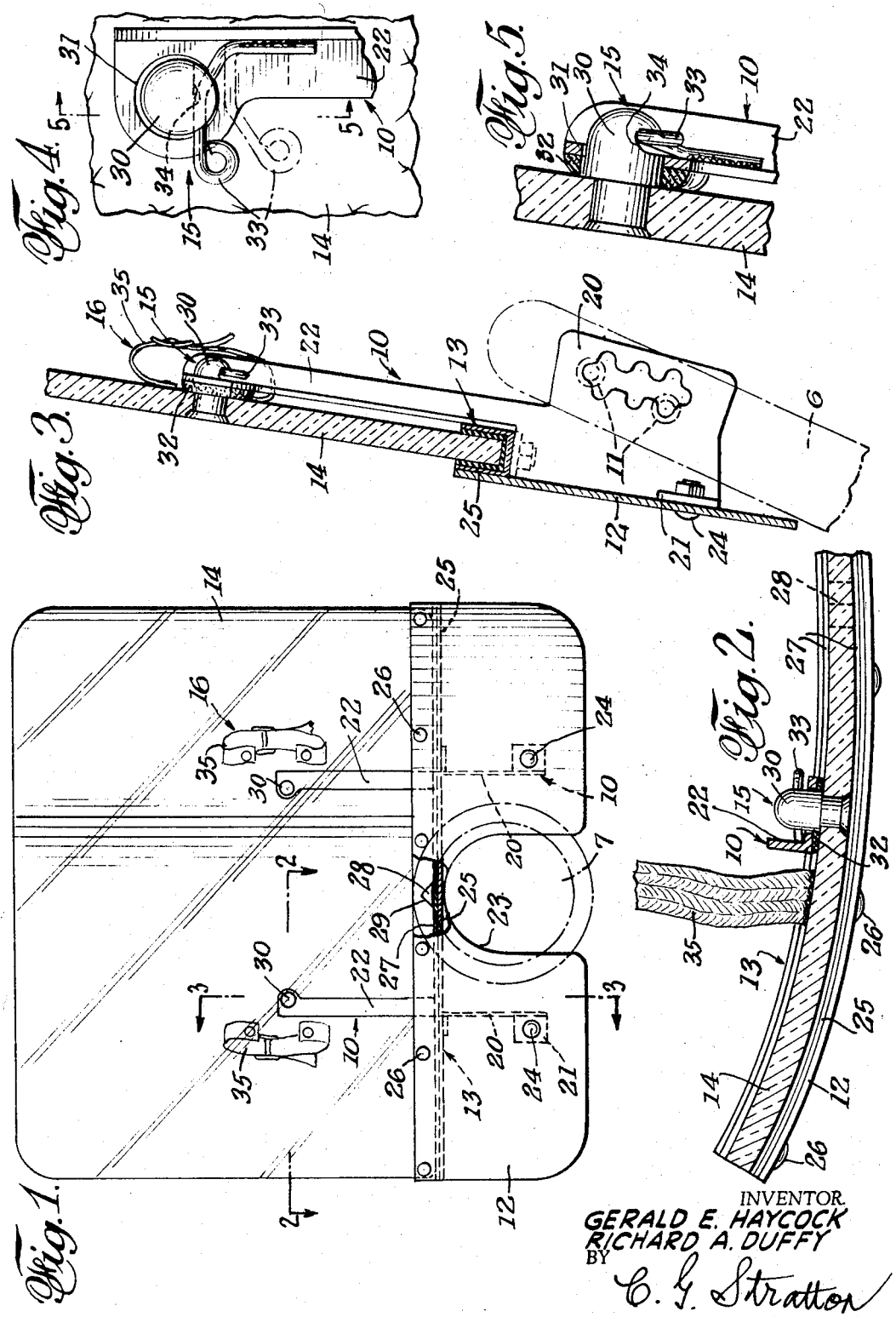

This invention relates to removable shields for motorcycles and has for an object to provide a bullet- and shatter-proof shield that, mounted on a motorcycle, serves as a windshield that is also protection against objects and missiles directed toward the rider, and, when removed from the motorcycle, serves as a protective shield that may be held in a manner to protect the person against missiles, as firearm projectiles and other propelled objects.

The present invention provides a structure that is especially useful to save peace officers and like personnel from being struck by bullets and like missiles, after leaving their transporting vehicles, in this case motorcycles. Such a structure comprises a protective windshield that is convertible into a hand-carried shield. Thus, the structure, when serving as a windshield, comprises a conveniently and readily demountable transparent member adapted to become a hand shield for the purposes above outlined.

Another object of the invention is to provide means, as above characterized, provided with an easily attachable and as easily detachable shield that affords the protection above mentioned both while attached to a motorcycle and when removed therefrom, and serving as a hand shield.

This invention also has for its objects to provide such means that are positive in operation, convenient in use, easily installed in a working position and easily disconnected therefrom, economical of manufacture, relatively simple, and of general superiority and serviceability.

The above objects are realized in a structure comprising a lower, metal front shield that is mounted on the steerable front fork of a motorcycle or other two- or three-wheeled vehicle, and has curved form to provide front and part side protection of the occupant of the vehicle, a similarly curved transparent, bullet-proof upper shield removably, yet firmly, attached to the lower shield to provide similar protection for said occupant, means to secure the two shields in a manner that enables the upper shield to be quickly mounted and as readily removed from the lower shield, and hand or arm gripping or hold member provided on the rear concave side of the upper shield by which the same may be handled and manipulated to afford desired protection against attack with firearms and projectiles, generally.

The invention also comprises novel details of construction and novel combinations and arrangements of parts, which will more fully appear in the course of the following description and which is based on the accompanying drawing. However, said drawing merely shows, and the following description merely describes, one embodiment of the present invention, which is given by way of illustration or example only.

In the drawing, like reference characters designate similar parts in the several views.

FIG. 1 is a front elevational view of the present removable shield structure.

FIG. 2 is a fragmentary and enlarged cross-sectional view, as taken on the ine 2—2 of FIG. 1.

FIG. 3 is a similarly enlarged vertical sectional view as taken on the line 3—3 of FIG. 1.

FIG. 4 is a further enlarged, fragmentary rear view showing one form of quick-release means for removably attaching the upper shield to the lower non-removable shield.

FIG. 5 is a vertical sectional view as taken on the line 5—5 of FIG. 4.

The motorcycle or other two- or three-wheeled vehicle on which the present improvements are mounted is represented by the usual fork 6 that mounts the steerable wheel, and the headlight 7 that is mounted at or near the upper end of said fork.

The protective shield assembly according to the present invention comprises, generally, a pair of similar but opposite brackets 10 symmetrically arranged on opposite sides of the center of the fork 6 and adapted to be secured thereto by fasteners 11, a lower metal shield 12 fixedly secured to said brackets 10 and spanning across the front of the fork 6 on which the brackets are mounted, a transverse channel 13 affixed to the inner face of the shield 12 and generally coextensive therewith, a bullet-proof, transparent upper shield 14 fitted, by its lower edge, into said channel, means 15 to detachably connect said upper shield 14 to the brackets 10 to hold the latter firmly against road shocks and vibration, generally, and means 16 on the inner face of the upper shield and serving as gripping or holding means by which the shield 14 may be manipulated after detachment from the vehicle, carried in a protective position in the manner of hand shields, and while so carried, enabling the user to see therethrough as well as shining the beam of a flashlight through the shield while held in the hand that carries the shield.

The brackets 10 are preferably formed of suitable sheet, stamped, cast or forged metal, each of which is formed to have a lower mounting end 20 by means of which the fasteners 11 adjustably connect the brackets to the fork 6. Each such end 20 is provided with a pad, lug or tab 21 that is adapted to engage the rear face of the lower shield 12. Each bracket 10 is provided with a vertical extension 22, the same being preferably parallel and having a cross-sectional form that renders them rigid. Thus, the brackets 10, when mounted on a steerable fork 6, provide two transversely spaced upper extensions that move with the fork as the latter is steered. It will be noted, particularly from FIG. 1, that said extensions are spaced on opposite sides of the middle of the vehicle as viewed from the front and that the same are relatively narrow to minimize interference with the line of sight of the occupant of the vehicle.

The lower shield 12, preferably of suitable sheet metal, has a transverse curvature and extent suitable to protect the user of the vehicle against missiles directed from the front. Said shield may have a central opening 23 that accommodates the headlight 7 hereinbefore mentioned. Suitable rivets or bolts 24 may fixedly secure the shield 12 to the mentioned tabs 21 of the brackets 10. The upper edge 25 of said shield is preferably straight except, of course, that the same follows the outer convex curvature of the shield, as seen in FIG. 2.

The channel 13 is open at the top, is formed of metal to be suitably rigid and is affixed, as by fasteners 26, to the inner convex side of the shield 12 preferably along said edge 25 of the latter. Said channel conforms to the curvature of shield 12. As seen best in FIG. 3, the channel 13 is provided with a resilient liner 27 forming a cushion on the inner faces of the channel. As seen best in FIG. 1, a wedge 28 is provided, preferably at the middle of the channel, and is used to locate the upper shield 14 centrally of the lower shield 12.

The transparent upper shield 14 is preferably formed of sheet plastic having two important properties, transparency and proof against penetration of projectiles and of shattering. Many thermoplastic resins, the acrylics among them, have these properties, but the choice of material need not be limited to acrylics, nor, for that matter, to plastics, since any transparent and impact resistant material may be used for the present purpose.

The shield 14 may have a thickness to fit the cushion-lined channel 13, may have the same transverse extent as said channel but may be wider, as desired, and be provided with a notch 29 into which the wedge 28 fits so the shield is centered transversely. The fit of the curved shield 14 in the channel is preferably such as to firmly locate the same but yet allowing slight angular movement relative to the channel 13 and the lower shield 12. In any case, the curvature of the channel 13 and the shield 14 provide that the mentioned movement of the latter is limited.

The detachable connecting means 15 may vary in detail since the same has the dual purpose of holding the shield 14 against removal until such is desired and firmly pressing the shield into cushioning engagement with the extensions 22 of the brackets 10. Said means 15 is preferably of the quick-release type so the shield may be quickly removed from the vehicle, and also is of the quick snap-retention type to insure firm locking thereof in place without the need for manipulating screws or other fasteners.

The detachable connecting means 15 is here shown as comprising transversely spaced and rearwardly directed studs 30 affixed to the shield 14, the same being located so as to register with holes 31 in the upper ends of the bracket extensions 22. It will be understood that these studs will enter the holes 31 when the shield 14 is pushed, in a downward direction, into the channel 13 and then allowed to be biased rearwardly by the resilient cushion liners 27 of the channel. The studs have rounded outer ends that facilitate this assembly of shield 14 in operative position. In practice, a cushioning pad 32 is provided on the end of each extension 22 so the rear convex face of the shield has cushioning contact with the extensions, as best seen in FIG. 5.

Said means 15 further includes a spring detent 33 secured to each extension 22 adjacent the hole 31 therein, and an undercut notch 34 in each stud 30 into which the respective detents snap as the shield 14 is mounted in place and the pads 32 compressed. This connection, which firmly, yet resiliently, holds the shield against the extensions 22, is readily released merely by extracting the detents from the notches 34, as indicated in FIG. 4, and allowing the shield 14 to be forwardly biased by the compressed cushion pad 32, thereby withdrawing the studs 30 from the holes 31. Now, it is a simple matter to remove the shield 14 from the channel 13.

The means 16 may also be varied, as desired. In this case arm-encircling and size-adjustable loops 35 may be provided on the convex face of the shield 14. While here shown as transversely spaced, said loops or other hand- or arm-engaging members may be vertically spaced, or only one such member may be provided. Regardless how formed and located, the loops 35 of said means 16 are accessible from the operator's position on the vehicle, are easily grasped and/or engaged by one arm after the means 15 has been released, so said operator may have the shield 14 in protective position while dismounting the vehicle.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. A shield for motorcycles and similar vehicles comprising:
    (a) a lower transversely curved shield provided with an upwardly extending channel,
    (b) bracket means affixed to the shield and adapted to be mounted on the steerable front fork of said vehicle with the convex face of the shield facing forwardly, said bracket means being provided with vertical extensions,
    (c) a transparent, bullet- and shatter-proof upper shield with its lower edge disposed in said channel and forming an upper extension of the lower shield, and
    (d) means to releasably connect the upper shield to the mentioned extensions to retain the upper shield releasably connected to the lower shield.

2. A shield according to claim 1 provided with hand or arm engaging means on the upper shield by which the latter is adapted to be held in protective position after removal of said upper shield from the lower shield.

3. A shield according to claim 1 in which the channel is provided with a cushioning liner to provide the edge of the upper shield with a resilient engagement allowing limited angular movement for the upper shield relative to the lower shield.

4. A shield according to claim 3 in which the mentioned extensions of the bracket means are provided with compressible pads that engage the concave, rearward face of the upper shield and are compressed by said shield by the mentioned releasable connection means.

5. A shield according to claim 1 in which the channel is provided with means to retain the upper shield against transverse displacement in the channel.

6. A shield according to claim 1 in which the releasable connection means comprises:
    (a) rearwardly directed studs on the upper shield in register with holes provided in the mentioned extensions, and
    (b) snap-retention detent means on the extensions and engaging the studs to lock the same and the extensions together.

References Cited

UNITED STATES PATENTS 3,127,855   4/1964   Conlon _____ 109—49.5

FOREIGN PATENTS 283,624   6/1952   Switzerland.

BENJAMIN HERSH, Primary Examiner.

A. J. PEKAR, Assistant Examiner.